(12) United States Patent
Hickey (10) Patent No.: US 10,507,877 B2
(45) Date of Patent: Dec. 17, 2019

(54) SELF-CENTERING GRILLE ASSEMBLY AND METHOD OF CENTERING A GRILLE

(71) Applicant: FORD GLOBAL TECHNOLOGIES, LLC, Dearborn, MI (US)

(72) Inventor: Joseph Prescott Hickey, Westland, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 269 days.

(21) Appl. No.: 15/491,586

(22) Filed: Apr. 19, 2017

(65) Prior Publication Data
US 2018/0304945 A1 Oct. 25, 2018

(51) Int. Cl.
*B60R 19/52* (2006.01)
*B62D 65/02* (2006.01)
*B60Q 1/04* (2006.01)

(52) U.S. Cl.
CPC ............ *B62D 65/024* (2013.01); *B60Q 1/04* (2013.01); *B60R 19/52* (2013.01); *B60R 2019/525* (2013.01)

(58) Field of Classification Search
CPC ........ B62D 65/024; B60Q 1/04; B60R 19/52; B60R 2019/525
USPC ....................................................... 296/193.1
See application file for complete search history.

(56) References Cited

U.S. PATENT DOCUMENTS

| | | | | |
|---|---|---|---|---|
| 9,115,737 B2 * | 8/2015 | Huttenlocher | .......... | B60R 19/52 |
| 9,457,845 B2 * | 10/2016 | Morris | .................. | B62D 27/02 |
| 10,059,293 B2 * | 8/2018 | Sharif | ..................... | B60R 19/52 |
| 2006/0157992 A1 * | 7/2006 | Sakamoto | ............... | B60R 19/52 |
| | | | | 293/115 |
| 2006/0249961 A1 * | 11/2006 | Flotzinger | ............... | B60R 19/04 |
| | | | | 293/115 |
| 2009/0001736 A1 * | 1/2009 | Makino | .................... | B60Q 5/00 |
| | | | | 293/115 |
| 2009/0195028 A1 | 8/2009 | Glickman et al. | | |
| 2010/0148525 A1 * | 6/2010 | Abdelnour | ............. | B60R 19/52 |
| | | | | 293/115 |
| 2011/0265415 A1 | 11/2011 | Clayton et al. | | |
| 2015/0023724 A1 | 1/2015 | Morris et al. | | |
| 2015/0093177 A1 | 4/2015 | Morris | | |
| 2015/0175217 A1 | 6/2015 | Morris et al. | | |
| 2015/0232130 A1 | 8/2015 | Colombo et al. | | |
| 2017/0001514 A1 * | 1/2017 | Watari | .................... | B60R 19/52 |

FOREIGN PATENT DOCUMENTS

| | | | | |
|---|---|---|---|---|
| EP | 0890487 A2 * | 1/1999 | ............ | B60R 19/52 |
| JP | 2015508729 A | 3/2015 | | |
| WO | WO-2012141004 A1 * | 10/2012 | ............ | B60R 19/52 |

OTHER PUBLICATIONS

English Machine Translation of JP2015508729A.

* cited by examiner

*Primary Examiner* — Hilary L Gutman
(74) *Attorney, Agent, or Firm* — Jason Rogers; Vichit Chea; King & Schickli, PLLC (57) ABSTRACT

A self-centering grille assembly includes a grille having a first chamfer and a second chamfer, a first outboard component including a third chamfer and a second outboard component including a fourth chamfer. An additional alternative embodiment of self-centering grille assembly including a centering bar is also disclosed as are related methods of centering a grille between a first outboard component and a second outboard component on a motor vehicle.

14 Claims, 7 Drawing Sheets

SELF-CENTERING GRILLE ASSEMBLY AND METHOD OF CENTERING A GRILLE

TECHNICAL FIELD

This document relates generally to the motor vehicle equipment field and, more particularly, to a self-centering grille assembly, to a centering bar for a motor vehicle grille and to a method of centering a grille between a first outboard component and a second outboard component on a motor vehicle.

BACKGROUND

Single piece variation as well as multi-piece stack-up variation make it difficult to maintain even margins around grilles during assembly. Often there is no "center" reference to use as a locator when installing grilles. Without a center reference or centered locator, an assembly fixture is typically required. Fixtures add substantial tooling costs, slow production and take up a significant amount of space on an assembly line.

While alternatives have been developed to remove the dependence on fixtures, the effectiveness of those alternatives typically depends on operator skill and technique. Thus, there is a constant tradeoff between installation efforts and self-centering ability. Unfortunately, in this situation, strong operator dependence leads to significant build variation.

This document relates to a new and improved self-centering grille assembly, a new and improved centering bar for a motor vehicle grille as well as to a new and improved method of centering a grille between a first outboard component and a second outboard component on a motor vehicle. Advantageously, the new self-centering grille assembly, centering bar and method eliminate dependence on assembly fixtures and precise operator skill and technique, greatly simplifying the grille centering process, significantly reducing build variation and substantially improving build quality.

SUMMARY

In accordance with the purposes and benefits described herein, a self-centering grille assembly is provided. That self-centering grille assembly comprises a grille including a first chamfer and a second chamfer. The self-centering grille assembly also includes a first outboard component including a third chamfer and a second outboard component including a fourth chamfer. When the grille is properly seated between the first outboard component and the second outboard component, the first chamfer engages the third chamfer and the second chamfer engages the fourth chamfer.

In some of the many possible embodiments of the self-centering grille assembly, the first outboard component is a first headlight assembly, the second outboard component is a second headlight assembly and the grille is positioned between the first headlight assembly and the second headlight assembly. The first chamfer, the second chamfer, the third chamfer and the fourth chamfer may be aligned on a single axis such as a cross car, lateral or Y-axis of the motor vehicle.

In accordance with an additional aspect, a self-centering grille assembly comprises a grille and a centering bar carried on the grille. The centering bar includes a first chamfer and a second chamfer. The self-centering grille assembly may further include a first outboard component having a third chamfer and a second outboard component having a fourth chamfer. When the grille is properly seated and centered between the first outboard component and the second outboard component, the first chamfer engages the third chamfer and the second chamfer engages the fourth chamfer effectively centering the grille along the first, cross car, lateral or Y-axis.

The centering bar may include a first incremental fastener. The grille may include a second incremental fastener and a third incremental fastener. The second incremental fastener may extend through a first opening in the centering bar and the third incremental fastener may extend through a second opening in the centering bar.

The self-centering grille assembly may further include a first removable clip on the second incremental fastener between the grille and the centering bar and a second removable clip on the third incremental fastener between the grille and the centering bar.

The self-centering grille assembly may also include a first receiver, a second receiver and a third receiver in a first aft component. The first incremental fastener engages the first receiver, the second incremental fastener engages the second receiver and the third incremental fastener engages the third receiver when the grille is properly seated between the first outboard component and the second outboard component.

In some embodiments, the first outboard component may be a first light assembly while the second outboard component may be a second light assembly. In some possible embodiments the first aft component may be selected from a group consisting of a grille opening reinforcement, an active grille shutter or a combination thereof.

In accordance with an additional aspect, a centering bar is provided for a motor vehicle grille. That centering bar comprises a body, a first chamfer carried on the body and a second chamfer carried on the body. The first chamfer may be oriented in a first direction and the second chamfer may be oriented in a second direction where the first direction is opposite to the second direction.

The centering bar may further include a first incremental fastener carried on the body. Further, the body may include a longitudinal axis and the first chamfer and the second chamfer may be aligned along that longitudinal axis. In addition, the first incremental fastener may be provided on the body between the first chamfer and the second chamfer.

In accordance with still another aspect, a method is provided of centering a grille between a first outboard component and a second outboard component on a motor vehicle. That method may be broadly described as comprising the steps of aligning the grille between the first outboard component and the second component and engaging chamfers on the grille with cooperating chamfers on the first outboard component and the second outboard component.

The method may further include the step of pressing the grille in a first direction along an X-axis between the first outboard component and the second outboard component until the grille is centered between the first outboard component and the second outboard component along the Y-axis by engagement of the chamfers on the grille with the cooperating chamfers on the first outboard component and the second outboard component.

In accordance with yet another aspect, a method is provided of centering a grille between a first outboard component and a second outboard component on a motor vehicle. That method comprises centering a centering bar carried on the grille along a Y-axis between the first outboard component and the second outboard component, securing the centering bar in a centered position on the motor vehicle and displacing the grille with respect to the centering bar along an X-axis to provide a desired installation of the grille.

The method may further include the step of pressing the grille a first time in a first direction along the X-axis to center the centering bar. In addition the method may include the step of releasing the grille to allow relative movement between the grille and the centering bar. More specifically, the method may include removing clips between the grille and the centering bar to release the grille and allow for the relative movement between the grille and the centering bar.

The method may further include the step of pressing the grille a second time in the first direction along the X-axis to displace the grille with respect to the centering bar and provide for the desired installation. In addition the method may include the step of securing the grille in a flush mount position.

Toward this end the method may include the step of engaging a first incremental fastener on the centering bar with a first receiver to secure the centering bar in the centered position. Further, the method may include the step of engaging a second incremental fastener and a third incremental fastener on the grille with a second receiver and a third receiver to secure the grille in the flush mount position.

In the following description, there are shown and described several preferred embodiments of the self-centering grille assembly, the centering bar for a motor vehicle grille and the related method of centering a grille between a first outboard component and a second outboard component on a motor vehicle. As it should be realized, the self-centering grille assembly, the centering bar and the related method are capable of other, different embodiments and their several details are capable of modification in various, obvious aspects all without departing from the self-centering grille assembly, centering bar and method as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the self-centering grille assembly, the centering bar for a motor vehicle grille and the related method of centering a grille between a first outboard component and a second outboard component on a motor vehicle and together with the description serve to explain certain principles thereof.

Reference will now be made in detail to the present preferred embodiments of the self-centering grille assembly, the centering bar and the related method of centering a grille between a first outboard component and a second outboard component on a motor vehicle, examples of which are illustrated in the accompanying drawing figures.

DETAILED DESCRIPTION

Figure 1A:
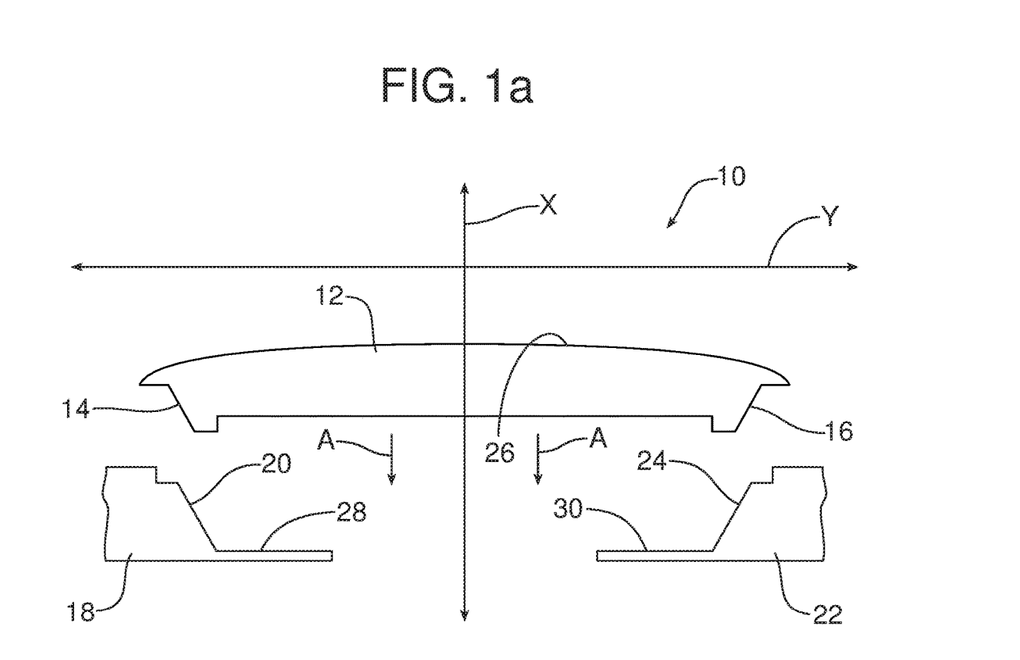
FIGS. 1a and 1b are schematic top plan views illustrating a first embodiment of self-centering grille assembly and a related method of centering the grille of that grille assembly between a first outboard component and a second outboard component on a motor vehicle.
Figure 1B:
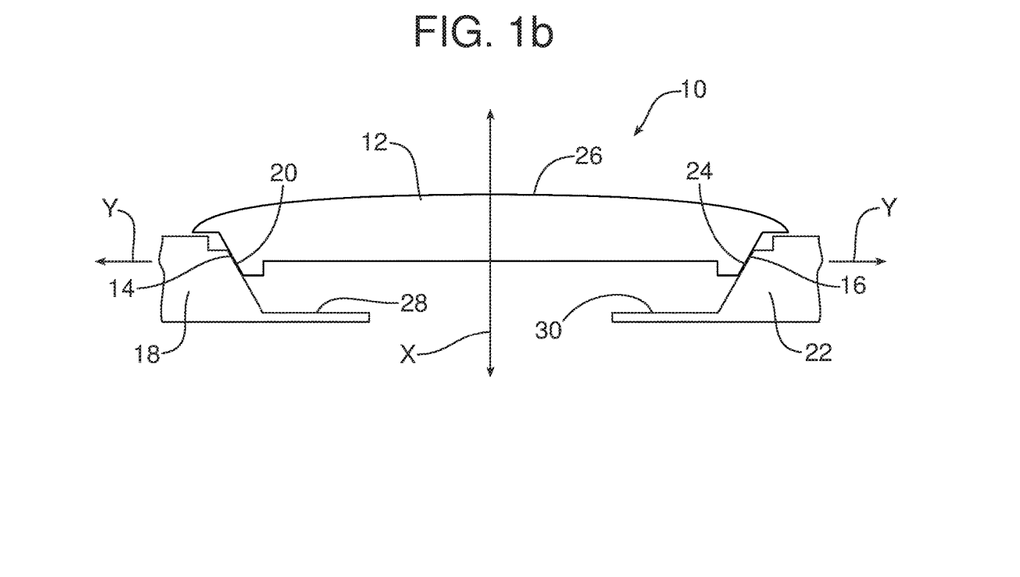

Reference is now made to FIGS. 1a and 1b illustrating a first embodiment of self-centering grille assembly 10. That self-centering grille assembly 10 includes a grille 12 including a first chamfer 14 and a second chamfer 16. The self-centering grille assembly 10 also includes a first outboard component 18 including a third chamfer 20 and a second outboard component 22 including a fourth chamfer 24.

In the illustrated embodiment, the first chamfer 14 and the second chamfer 16 are located behind the front face 26 of the grille 12 while the third chamfer 20 and fourth chamfer 24 are located along the respective forward faces 28, 30 of the first outboard component 18 and the second outboard component 22.

The first outboard component 18 may, for example, comprise a first headlight assembly while the second outboard component 22, may comprise a second headlight assembly with the grille 12 being centered therebetween.

The method of centering the grille 12 between the first outboard component 18 and second outboard component 22 on a motor vehicle includes the initial step of aligning the grille between the first outboard component and the second outboard component so that the first chamfer 14 is oriented toward the third chamfer 20 and the second chamfer 16 is oriented toward the fourth chamfer 24. See FIG. 1a.

Next is the step of engaging the chamfers 14 and 16 on the grille 12 with the cooperating chamfers 20 and 24 on the respective first and second outboard components 18, 22. More specifically, this is done by pressing the grille 12 in a first direction (note action arrows A) along the X-axis which corresponds to the longitudinal axis of the motor vehicle. This causes the first chamfer 14 on the grille 12 to engage with the third chamfer 20 on the first outboard component 18 and the second chamfer 16 on the grille to engage the fourth chamfer 24 on the second outboard component 22. This engagement of the chamfers 14, 16, 20, 24 functions to center the grille 12 along the lateral or Y-axis of the motor vehicle between the first outboard component 18 and second outboard component 22 in a very efficient and effective manner that virtually ensures proper centering regardless of assembly line worker skill and technique. See FIG. 1b.

Reference is now made to FIGS. 2a-2d illustrating an alternative embodiment of self-centering grille assembly 50. As illustrated, the self-centering grille assembly 50 includes a grille 52 and a centering bar 54 carried on the grille 52. The centering bar 54 includes a first chamfer 56 and a second chamfer 58. In the illustrated embodiment, the first chamfer 56 and the second chamfer 58 are provided at opposite ends of the centering bar with the first chamfer oriented outward in a first direction and the second chamfer oriented outward in a second direction wherein the first direction is opposite to the second direction. As illustrated, the body of the centering bar 54 includes a longitudinal axis L and the first chamfer 56 and the second chamfer 58 are aligned along and at the ends of that longitudinal axis.

Figure 2A:
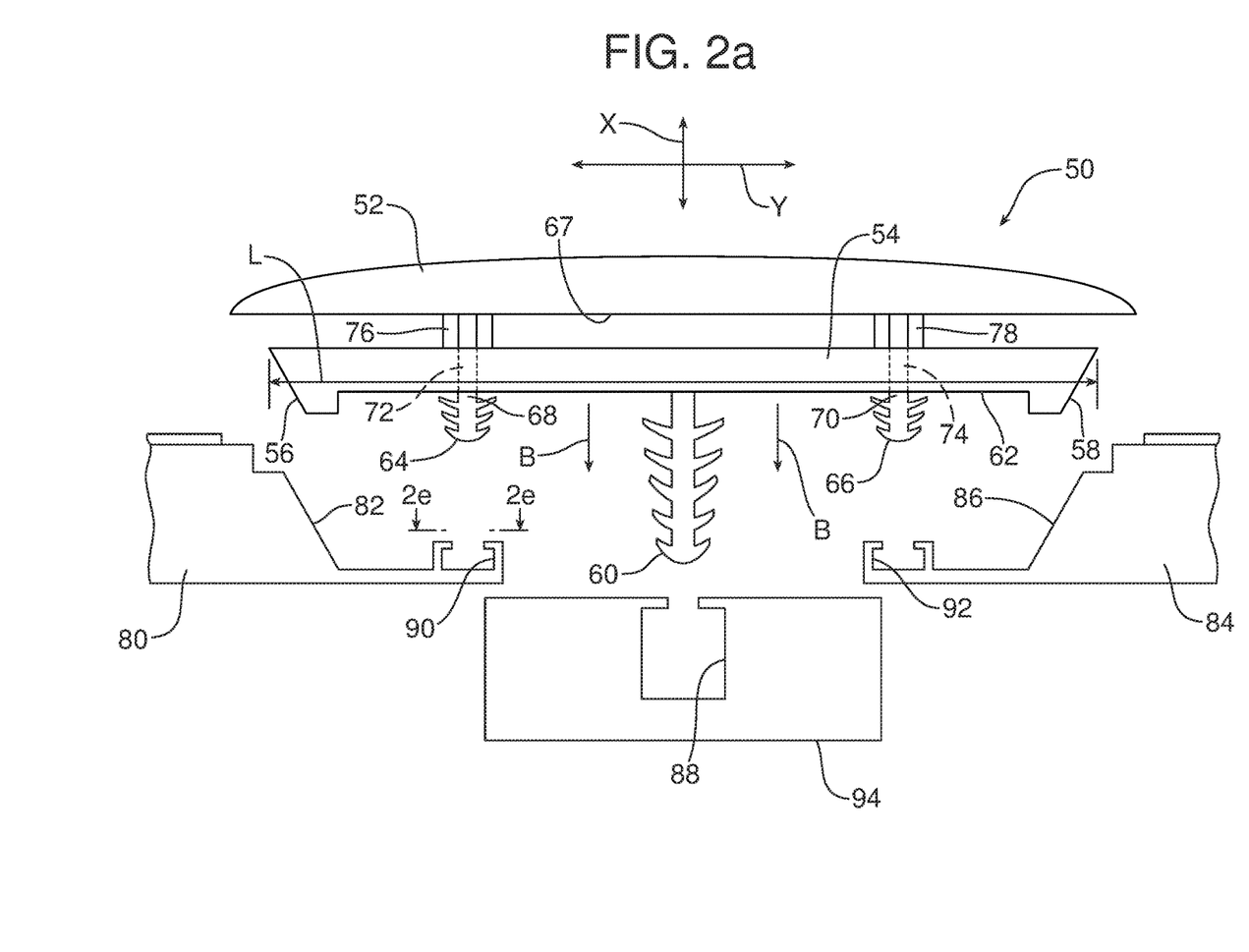
FIGS. 2a-2d are a series of schematic top plan views illustrating a second embodiment of self-centering grille assembly which includes a centering bar as well as a related method of centering that self-centering grille assembly between a first outboard component and a second outboard component of a motor vehicle.
Figure 2B:
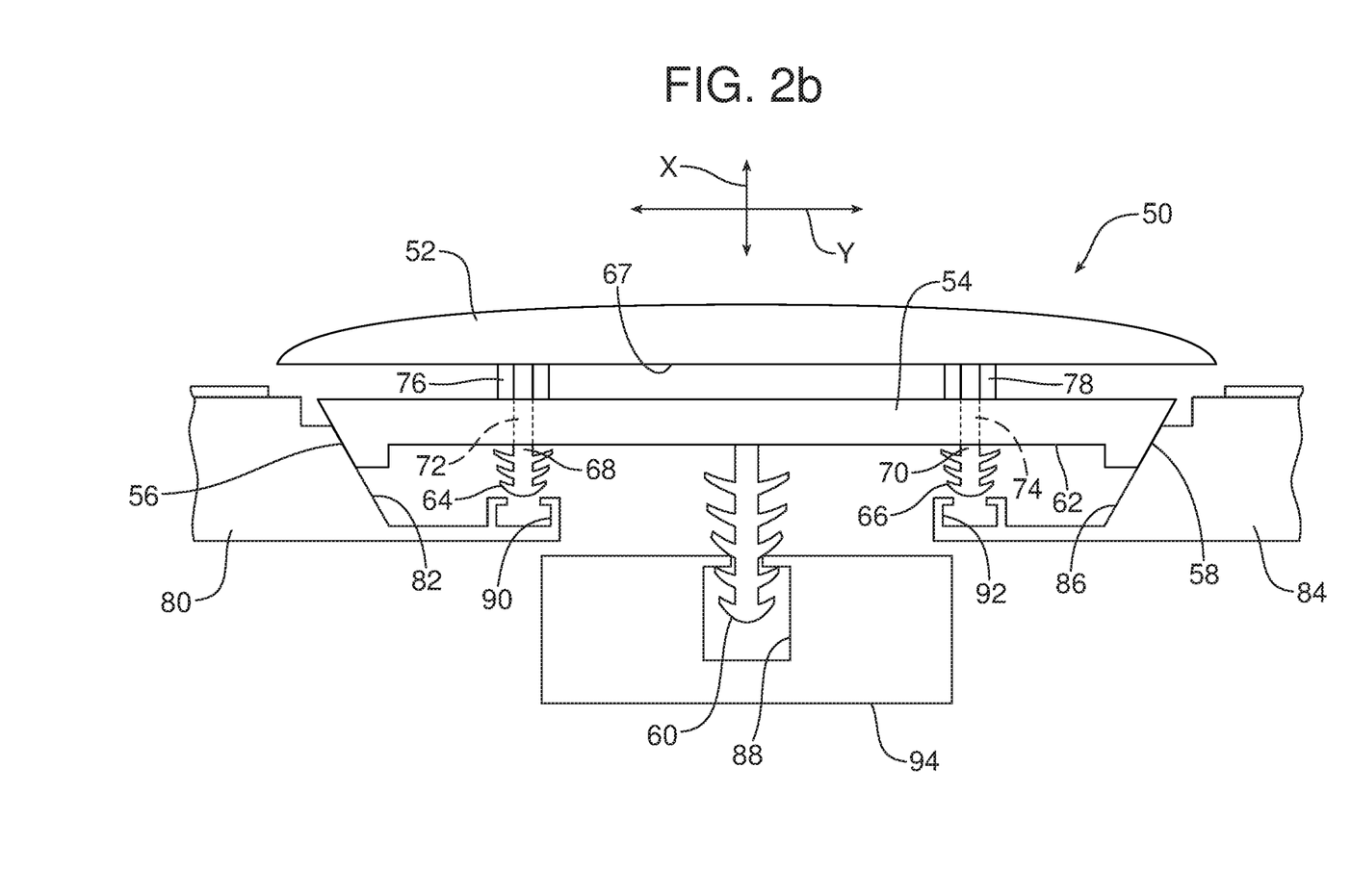
Figure 2C:
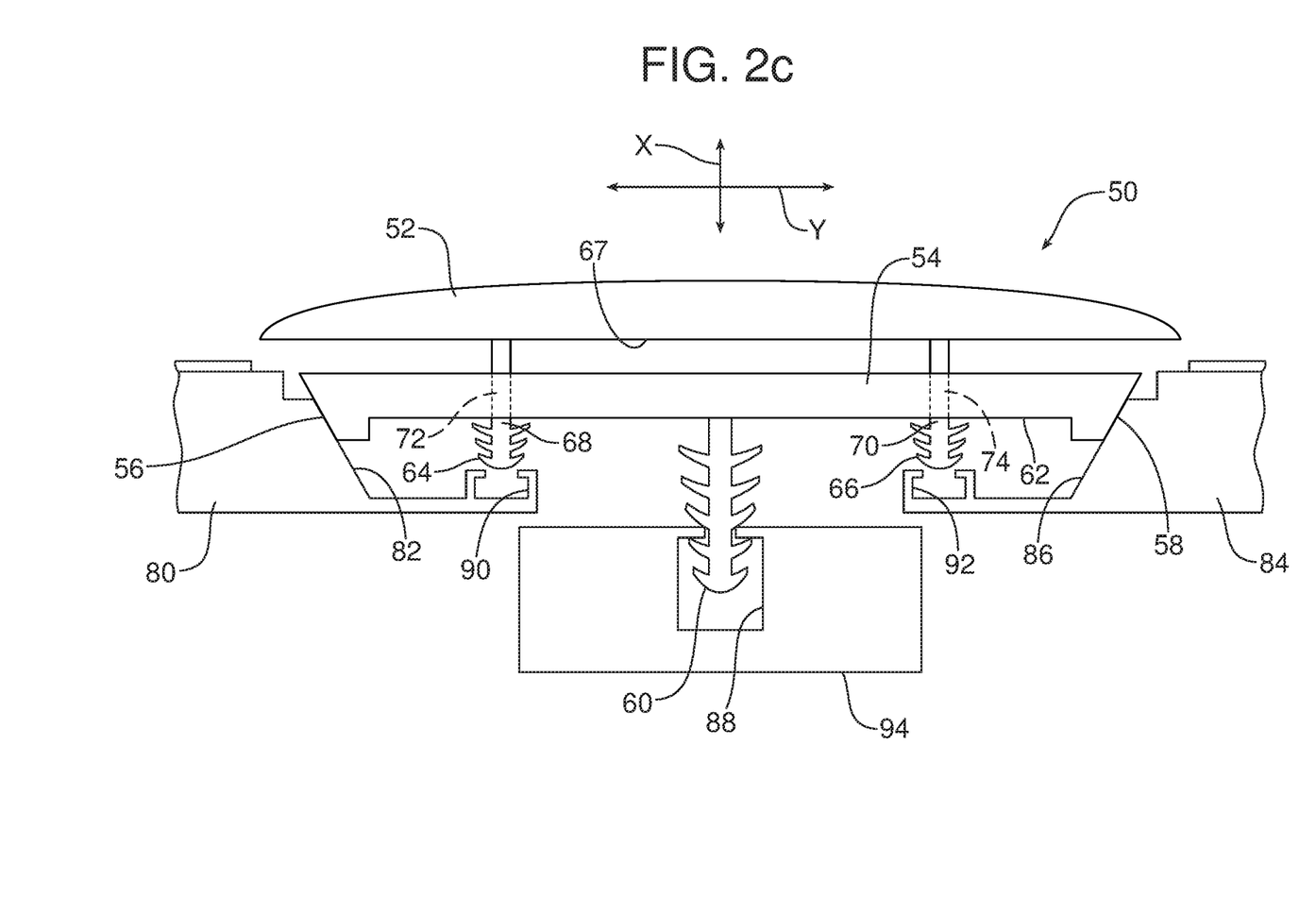

A first incremental fastener 60 is carried on the rear face 62 of the body of the centering bar 54 between the first chamfer 56 and second chamfer 58. In the illustrated embodiment, the first incremental fastener 60 comprises a "Christmas tree" type fastener including multiple flanges.

As further illustrated in FIG. 2a, the grille 52 includes a second incremental fastener 64 and a third incremental fastener 66 projecting from the rear face 67 of the grille. The second incremental fastener 64 and the third incremental fastener 66 are provided at the distal ends of respective elongated shafts 68, 70. In the illustrated embodiment, the first shaft 68 extends through a first opening 72 in the centering bar 54 while the second shaft 70 extends through a second opening 74 in the centering bar.

As further illustrated in FIG. 2a, a first removable spacer or clip 76 is fixed around the first shaft 68 between the grille 52 and the centering bar 54. Similarly, a second removable spacer or clip 78 is fixed around the second shaft 70 between the grille 52 and the centering bar 54. When the removable spacer or clips 76, 78 are properly seated on the shafts 68, 70, the centering bar is rigidly connected to the grille 52. As further illustrated in FIG. 2a, the self-centering grille assembly 50 also includes a first outboard component 80 having a third chamfer 82 and a second outboard component 84 having a fourth chamfer 86.

Figure 2D:
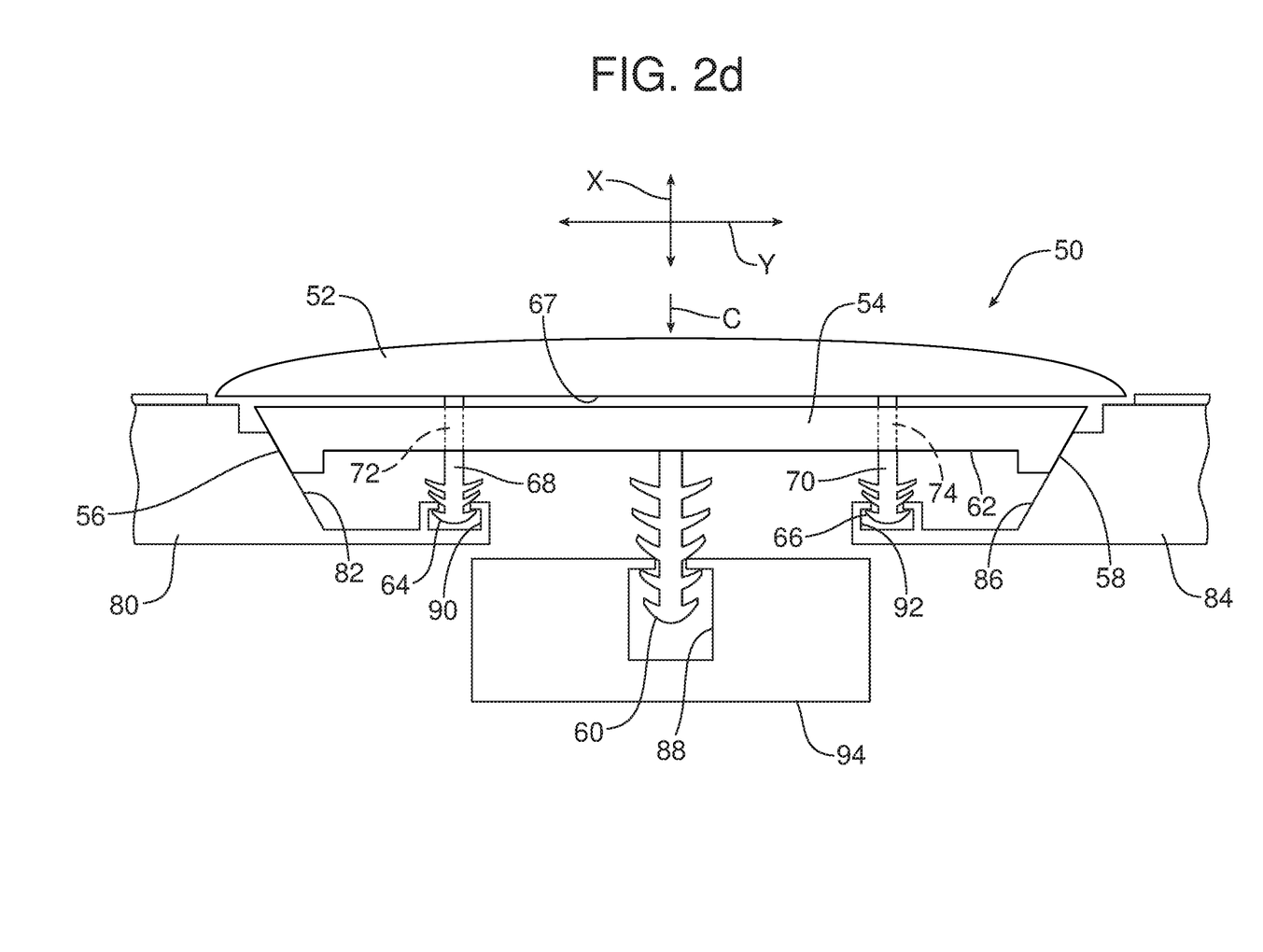
Figure 2E:
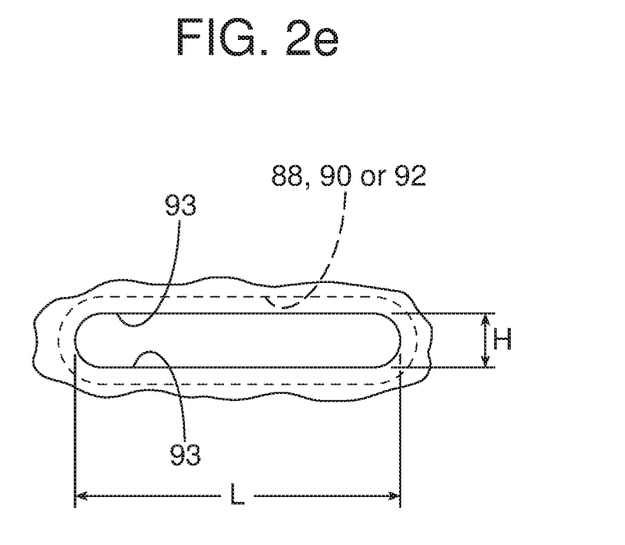
FIG. 2e is a front elevational of the receivers that engage and hold the incremental fasteners while allowing for lateral adjustment of the grille.

The self-centering grille assembly 50 also includes a first receiver 88, a second receiver 90 and a third receiver 92. As illustrated in FIG. 2d, and explained in greater detail below, when the grille 52 is properly seated between the first outboard component 80 and the second outboard component 84, the first incremental fastener 60 engages with the first receiver 88, the second incremental fastener 64 engages with the second receiver 90 and the third incremental fastener 66 engages with the third receiver 92. As illustrated in FIG. 2e, each receiver 88, 90, 92 comprises a slot, elongated with a length L extending along the Y axis to allow lateral adjustment of the position of the grille 52 and a height H in the vertical or Z-axis direction with opposed shoulders 93 to engage and hold the flanges of the incremental fasteners 60, 64, 66.

In the illustrated embodiment, the first receiver 88 is provided in the first aft component 94 while the second receiver 90 is provided in the first outboard component 80 and the third receiver 92 is provided in the second outboard component 84. That first outboard component 80 may comprise a first light assembly while the second outboard component 84 may comprise a second light assembly and the first aft component 94 may be selected from a group of components consisting of a grille opening reinforcement (GOR), an active grille shutter (AGS) or a combination thereof. In other embodiments, the second receiver 90 and the third receiver 92 may be provided in the first aft component 94.

FIGS. 2a-2d illustrate an alternative method of centering a grille 52 between a first outboard component 80 and a second outboard component 84 on a motor vehicle. That method comprises a number of steps including centering the centering bar 54 carried on the grille 52 along a Y-axis between the first outboard component 80 and the second outboard component 84, securing the centering bar in a centered position and then displacing the grille with respect to the centering bar along an X-axis to provide a desired installation of the grille in the X or longitudinal direction of the motor vehicle.

This may be accomplished by pressing the grille 52 a first time in a first direction (note action arrows B in FIG. 2a) along the X-axis so as to center the centering bar 54 along the cross car, lateral or Y-axis of the motor vehicle. This centering action is provided by engagement of the first chamfer 56 on the centering bar 54 with the third chamfer 82 on the first outboard component 80 and engagement of the second chamfer 58 on the centering bar with the fourth chamfer 86 on the second outboard component 84. As the centering bar 54 is being centered by engagement between the chamfers 56, 58, 82, 86, the first incremental fastener 60 engages in the first receiver 88 to secure the centering bar in the centered position between the first and second outboard components 80, 84. See FIG. 2b.

Next, the method includes the step of releasing the grille 52 to allow relative movement between the grille and the centering bar 54. More specifically, this is accomplished by removing the first and second removable spacers or clips 76, 78 from the respective first shaft 68 and the second shaft 70 between the grille 52 and the centering bar 54. Compare FIGS. 2b and 2c. When the removable spacers or clips 76, 78 are removed, the centering bar 54 slides freely over the shafts 68 and 70. This is then followed by the step of pressing the grille 52 a second time in the first direction along the X-axis (note action arrow C in FIG. 2d) to displace the grille with respect to the centering bar 54 along the X-axis and provide for a desired, flush installation of the grille in the longitudinal or X-axis direction of the motor vehicle. As this is done, the grille is being secured in place in the flush mount position by engaging the second incremental fastener 64 in the second receiver 90 and the third incremental fastener 66 in the third receiver 92.

As should be appreciated from the preceding description, the engagement of the first chamfer 56 with the third chamfer 82 and the second chamfer 58 with the fourth chamfer 86, functions to center the grille 52 along the Y-axis of the motor vehicle between the first outboard component 80 and the second outboard component 84. At the same time the first incremental fastener 60 accommodates tolerance variation while the engagement of the first incremental fastener with the first receiver 88 functions to secure the centering bar 54 in a center reference position: that is, the centering bar 54 acts as a proper locator for the grille 52.

The second incremental fastener 64 and third incremental fastener 66 then function to accommodate tolerance variations to provide a flush fit of the grille 52 along the longitudinal or X-axis of the motor vehicle when the grille 52 is pushed again in the X direction following removal of the removable clips 76, 78. Accordingly, it should be appreciated that the method of centering the grille 52 illustrated in FIGS. 2a-2d may be performed by a simple pressing or pushing of the grille a first time, followed by removal of the removable clips 76, 78 and then a second simple pressing or pushing of the grille in the same direction a second time. This simple and efficient method virtually eliminates installer skill and technique from the grille centering process and ensures proper fit and finish in a quick and effective manner that boosts assembly line productivity.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. A self-centering grille assembly, comprising:
a grille;
a centering bar carried on said grille, said centering bar including a first chamfer, a second chamfer and a first incremental fastener;
a first outboard component having a third chamfer engaging said first chamfer; and a second outboard component having a fourth chamfer engaging said second chamfer whereby said grille is centered along a first axis.

2. The self-centering grille assembly of claim 1, wherein said grille includes a second incremental fastener and a third incremental fastener.

3. The self-centering grille assembly of claim 2, wherein said second incremental fastener extends through a first opening in said centering bar and said third incremental fastener extends through a second opening in said centering bar.

4. The self-centering grille assembly of claim 3, including a first removable clip on said second incremental fastener between said grille and said centering bar and a second removable clip on said third incremental fastener between said grille and said centering bar.

5. The self-centering grille assembly of claim 4, including a first receiver, a second receiver and a third receiver, said first incremental fastener engaging said first receiver, said second incremental fastener engaging said second receiver, and said third incremental fastener engaging said third receiver when said grille is properly seated between said first outboard component and said second outboard component.

6. The self-centering grille assembly of claim 5, wherein said first outboard component is a first light assembly, said second outboard component is a second light assembly and said third receiver is in a first aft component selected from a group consisting of a grille opening reinforcement, an active grille shutter or a combination thereof.

7. A method of centering a grille between a first outboard component and a second outboard component on a motor vehicle, comprising:

centering a centering bar carried on said grille along a Y-axis between said first outboard component and said second outboard component;

securing said centering bar in a centered position; and displacing said grille with respect to said centering bar in a first direction along an X-axis to provide a desired installation of said grille.

8. The method of claim 7, including pressing said grille a first time in said first direction along said X-axis to center said centering bar.

9. The method of claim 8, including releasing said grille to allow relative movement between said grille and said centering bar.

10. The method of claim 9, including pressing said grille a second time in said first direction along said X-axis to displace said grille with respect to said centering bar and provide said desired installation.

11. The method of claim 10, including securing said grille in a flush mount position.

12. The method of claim 11, including engaging a first incremental fastener on said centering bar with a first receiver to secure said centering bar in said centered position.

13. The method of claim 12, including removing clips between said grille and said centering bar to release said grille and allow relative movement between said grille and said centering bar.

14. The method of claim 13, including engaging a second incremental fastener and a third incremental fastener on said grille with a second receiver and a third receiver to receive said grille in said flush mount position.

* * * * *